July 19, 1966　　　F. JENSEN ETAL　　　3,261,588
MEANS FOR TYING LADING COMPRISING CHAIN ENGAGING
RECIPROCATING LEVER MEANS
Filed Dec. 10, 1964　　　　　　　　　　　6 Sheets-Sheet 1

INVENTORS
FINN JENSEN
THEODORE J. SWEGER
BY
Robert R. Lockwood
Atty.

July 19, 1966  F. JENSEN ETAL  3,261,588
MEANS FOR TYING LADING COMPRISING CHAIN ENGAGING
RECIPROCATING LEVER MEANS
Filed Dec. 10, 1964  6 Sheets-Sheet 2

July 19, 1966

F. JENSEN ETAL

3,261,588

MEANS FOR TYING LADING COMPRISING CHAIN ENGAGING
RECIPROCATING LEVER MEANS

Filed Dec. 10, 1964

United States Patent Office 3,261,588
Patented July 19, 1966

3,261,588
MEANS FOR TYING LADING COMPRISING CHAIN ENGAGING RECIPROCATING LEVER MEANS
Finn Jensen, Riverdale, and Theodore J. Sweger, Naperville, Ill., assignors to Illinois Railway Equipment Company, Chicago, Ill., a corporation of Illinois
Filed Dec. 10, 1964, Ser. No. 417,319
4 Claims. (Cl. 254—74)

This invention relates, generally, to means for tying lading, such as lumber, wallboard, and the like to beds of railway flatcars, trucks and the like and more particularly to means for tensioning chains employed for this purpose.

Among the objects of this invention are: To provide improved means for tensioning chains employed for tying lading in place on the beds of flatcars, trucks and the like; to tension a chain for this purpose by moving a free end thereof by a lever to which the chain is attached by moving the point of attachment in the direction in which the chain is tensioned; to lock the chain to the frame forming a part of the chain tensioning means under tension by a pawl located remote from the axis of the lever; to hold the pawl against release of the tension of the chain; and to provide for releasing the pawl to release the chain while the chain is under tension and independently of the lever.

In accordance with one embodiment of this invention for accomplishing the foregoing objects a second class lever is pivoted between the sides of a trough-shaped frame that is arranged to be anchored against movement, as by a length of chain extending part way around the lading one end of which is secured to the bed of the flatcar, truck or the like while the other end is attached to the frame. The free end of another length of chain also extending part way around the lading which is fastened at its other end to the bed of the flatcar or truck, extends into one end of the trough-shaped frame remote from the pivot axis of the lever. A chain link receiving slot is provided in the second class lever between its fulcrum or pivot axis and its distal end for readily detachably receiving a link of the free end of the chain to permit tensioning thereof on rotation of the lever and movement of the chain link receiving slot in the direction in which the chain is tensioned. A chain locking pawl is pivoted between the walls of the frame adjacent the end through which the free end of the chain extends and it has a pair of depending detents for engaging a link of the chain to hold it under tension as applied by the lever. The chain locking pawl also is provided with a laterally extending pawl retaining arm which is engaged by a pawl retainer pivoted to the sides of the frame to hold the pawl in chain restraining position. On rotation of the pawl retainer to released position, the pawl is free to rotate under the tension of the chain to a chain released position.

According to another embodiment of the invention a link of the free end of the chain is engaged by the distal end of a first class lever which is fulcrumed between the walls of the trough shaped frame and, on rotation of the lever, the chain is tensioned by movement of its distal end in the direction in which the chain is tensioned. A chain locking pawl is pivoted between the sides of the frame and has a pair of depending detents to engage a link of the free end of the chain and hold it as tensioned by the lever. One or both of the detents react against the bottom of the frame to limit rotation of the chain locking pawl and to hold it against rotation under the tension of the chain.

Figure 1:
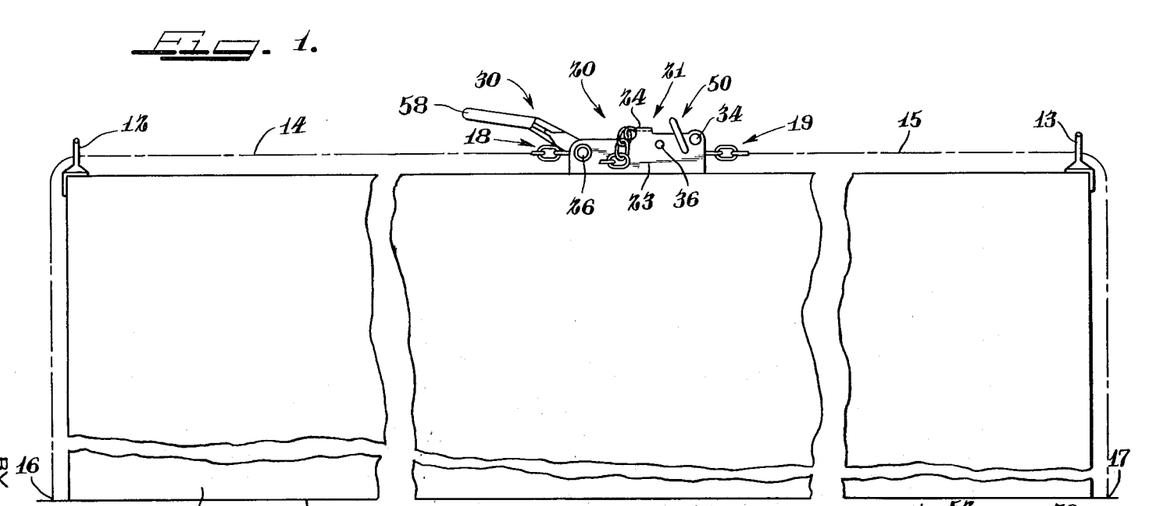
FIG. 1 is an end view of lading on the flat bed of a railway flat car or truck and shows how chain tightening means constructed in accordance with this invention can be employed for tensioning tying chains anchored at their ends to the bed and extending part way around the lading and toward each other.

Referring to FIG. 1, the reference character 10 designates a bed of a railway flat car or truck or the like on which lading, indicated at 11, is positioned and to which it is to be secured. The lading 11 can be wallboard, plywood, etc. Corner brackets 12 and 13 are located at the upper left and right corners over which lading tying chains 14 and 15 are trained. At one end each of the chains 14 and 15 is anchored at 16 and 17 to the bed 10. The showing of the anchors for the chains 14 and 15 is diagrammatic since any suitable anchor means can be employed. It will be noted that the tying chains 14 and 15 extend upwardly along the vertical sides of the lading 11, are trained over the corner brackets 12 and 13 with the free ends 18 and 19 arranged to be fastened together and to be tensioned by chain tensioning means, indicated generally at 20, to which this invention is directed.

The chain tensioning means 20 includes frame means, indicated at 21, that is trough shaped and formed of suitable metal such as cast steel or fabricated from steel plate. Other suitable material having the requisite strength can be used. The frame means 21 includes upstanding sides 22 and 23 that are connected intermediate their ends by a bridge 24. They are joined by a bottom wall 25 which rests on the lading 11 as shown in FIGS. 1 and 3.

At its left end the frame means 21 has a transverse pin 26 extending through the sides 22 and 23 with the outer ends headed over. The pin 26 extends through a link 27 of the free end 18 of the tying chain 14 and serves to anchor the frame means 21 against movement in a direction tending to increase the tension applied to the chain 14.

Figure 3:
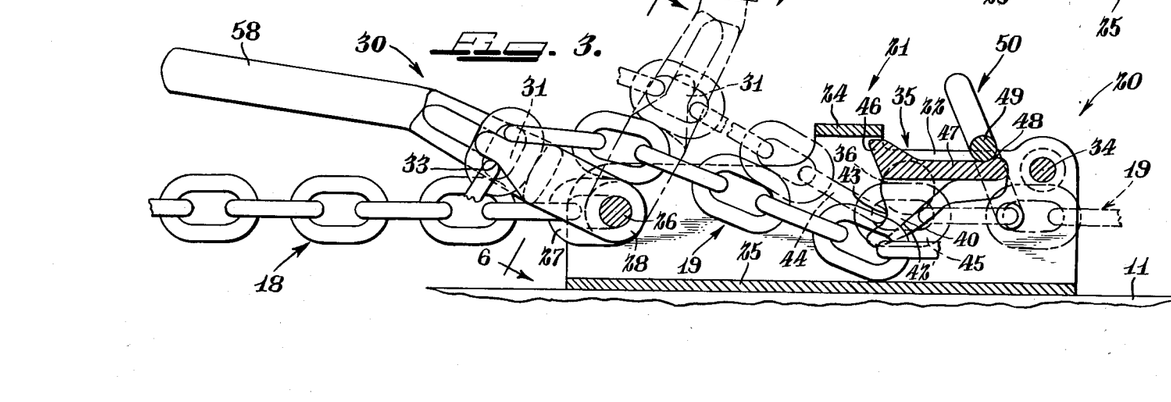
FIG. 3 is a vertical sectional view taken generally along the line 3—3 of FIG. 2.
Figure 4:
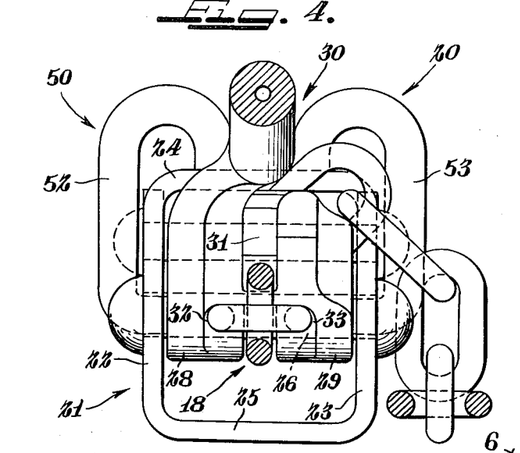
FIG. 4 is a view, in end elevation, at an enlarged scale, looking from left to right, of the chain tensioning means shown in FIG. 3.

Also mounted on the transverse pin 26 are furcations 28 and 29 of a bifurcated second-class lever, indicated generally at 30, which is arranged to be swung from the position shown by broken lines in FIG. 3 to the position shown by full lines for the purpose of tensioning the chains 14 and 15. For this purpose the lever 30 intermediate its ends is provided with chain link receiving slot 31 which has shoulders 32 and 33 against which the juxtaposed portions of one of the links of the free end 19 of the chain 15 are adapted to bear. It will be understood that, when the lever 30 is swung from the broken-line position shown in FIG. 3 with one of the links of the free end 19 engaging the shoulders 32 and 33, both of the chains 14 and 15 are tightened to the extent that the free end 19 is moved in the direction in which the tension is applied to the chain 15.

Figure 2:
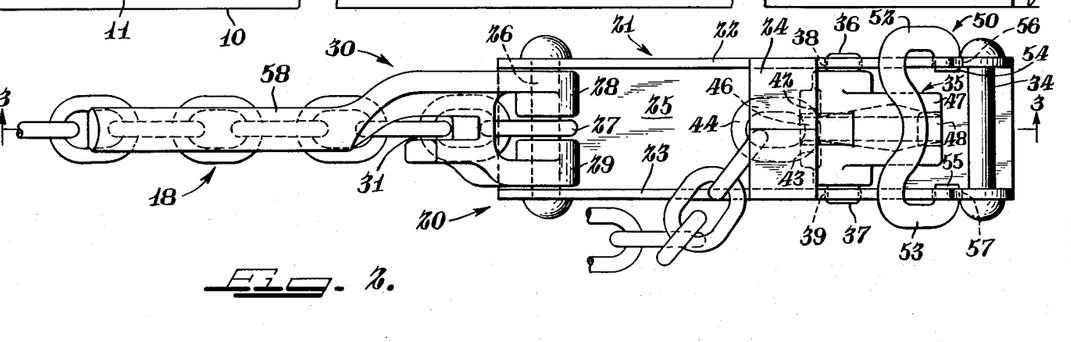
FIG. 2 is a top plan view, at an enlarged scale, of the chain tensioning means.
Figure 5:
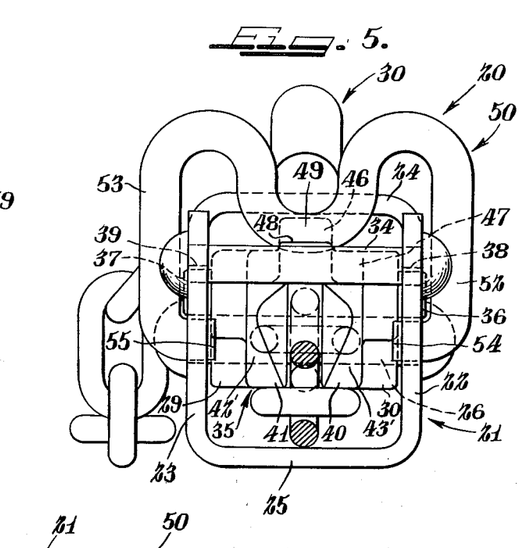
FIG. 5 is a view, similar to FIG. 4, looking from right to left of the chain tensioning means shown in FIG. 3.

The free end 19 of the chain 15 is held against retrograde movement after it has been partially tensioned by movement of the lever 30 by a chain locking pawl 35. As shown in FIGS. 2, 3 and 5 the chain locking pawl 35 is provided with laterally outwardly extending trunnions 36 and 37 which project through openings 38 and 39 in the upstanding sides 22 and 23 of the frame means 21. Formed integrally with the chain locking pawl 35 are depending detents 40 and 41 that are provided with shoulders 42 and 43 that are arranged to bear against a link, for example link 44 of the free end 19 of the chain 15, to prevent retrograde movement thereof. The adjacent link 45, FIG. 3, is positioned between the detents 40 and 41. An arm 46, also integral with the chain locking pawl 35, is arranged to engage the underside of the bridge 24 for limiting rotation of the chain locking pawl 35 in a clockwise direction.

In order to hold the chain locking pawl 35 against counterclockwise movement and to retain the tension that has been applied to the chains 14 and 15 by movement of the lever 30 from the position shown by broken lines in FIG. 3 to its position shown by full lines, there is provided a pawl retaining arm 47 that is integral with the chain locking pawl and extends laterally therefrom generally parallel to the bottom wall 25 of the frame means 21 in the chain retaining position. At its distal end the pawl retaining arm 47 has an integral shoulder 48 that is arranged to be engaged by an intermediate portion 49 of a bifurcated pawl retainer 50. The pawl retainer 50 has furcations 52 and 53, FIG. 5, which extend downwardly along the upstanding sides 22 and 23 of the frame means 21 and they have inwardly extending trunnions 54 and 55 that are inserted in openings 56 and 57, FIG. 2, in the sides 22 and 23.

The lever 30 has a handle 58 that can be grasped manually for tightening the chains 14 and 15. Additional leverage can be provided by telescoping over the handle 58 a pipe extension indicated by broken lines at 59 in FIG. 3.

Figures 6, 7, 8:
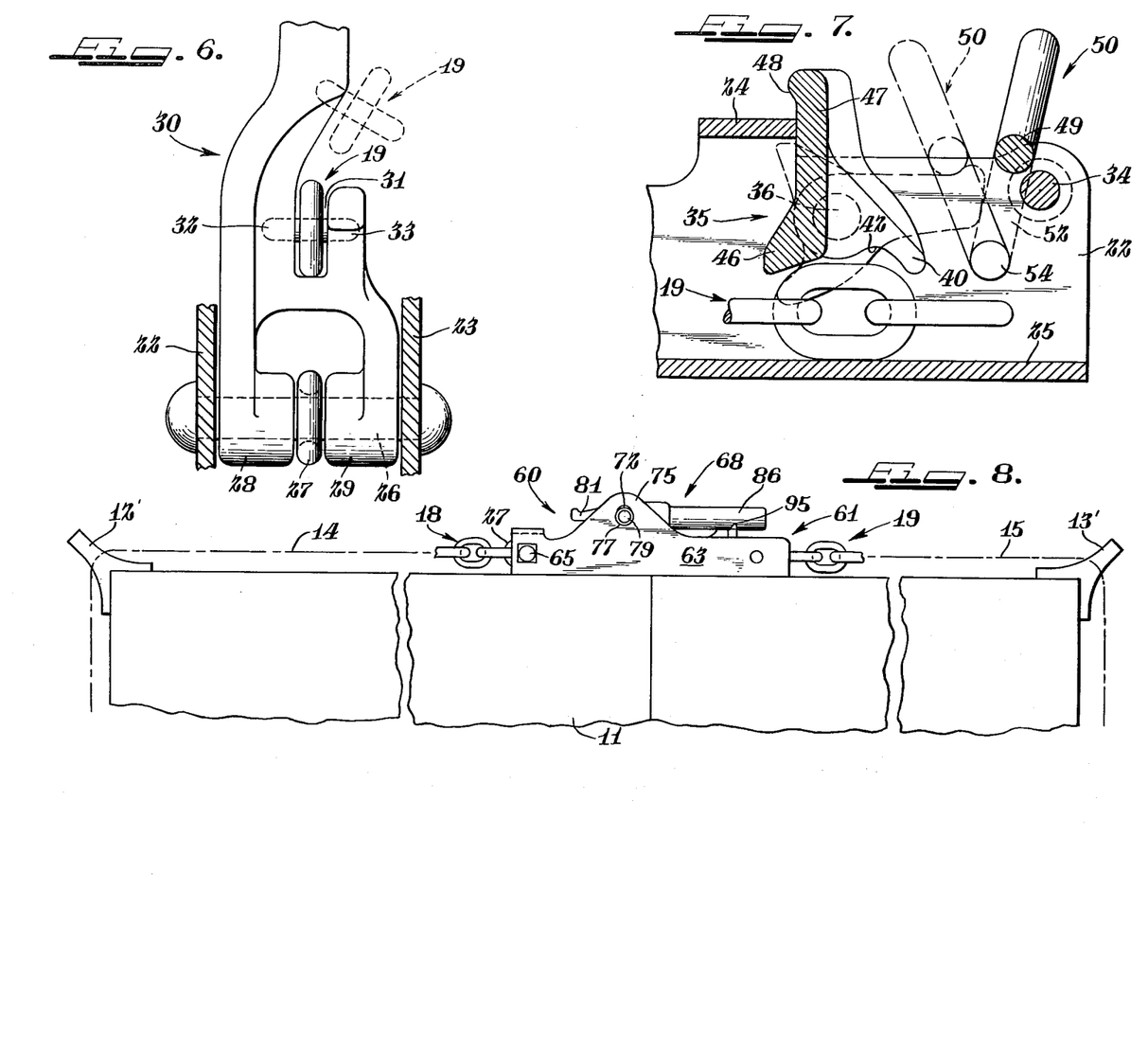
FIG. 6 is a sectional view, at an enlarged scale, taken generally along the line 6—6 of FIG. 3.
FIG. 7 is a view, similar to the right end of FIG. 3, at an enlarged scale, to show different positions of the chain locking pawl and pawl retainer.
FIG. 8 is a view, similar to FIG. 1, and shows a modified construction of the chain tensioning means.
Figures 9, 10:
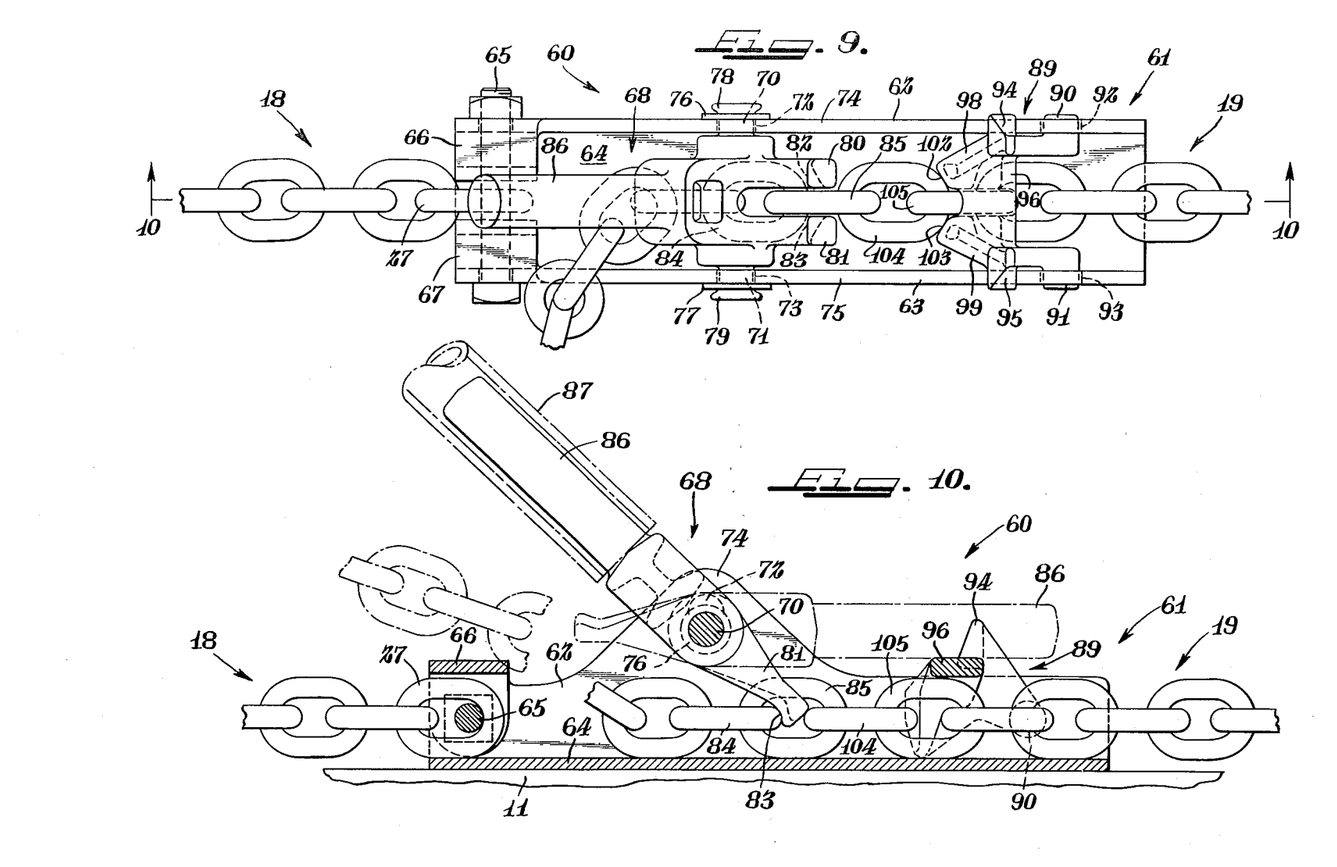
FIG. 9 is a top plan view, at an enlarged scale, of the chain tightening means shown in FIG. 8.
FIG. 10 is a vertical sectional view taken generally along the line 10—10 of FIG. 9.

In operation the chain tensioning means 20 is applied to the lading 11 as illustrated in FIG. 1 with the chain 14 being of such length as to locate the chain tightening means 20 substantially midway between the vertical sides of the lading 11. The free end 19 of the chain 15 is introduced into the right end of the trough shaped frame means 21 underneath the transverse pin 34 and underneath the chain locking pawl 35 as shown by full lines in FIGS. 3 and 5. The pawl retaining arm 47 remains in engagement with the intermediate portion 49 of the pawl retainer 50 while the free end 19 is being threaded through the frame means 21. A link of the free end 19 is positioned in the chain link receiving slot 31 by moving it from the broken line position to the full line position as illustrated in FIG. 6 while the lever 30 is in the broken line position shown in FIG. 3. Preferably this is accomplished with as much tension as possible having been taken out of the chains 14 and 15 by first manually pulling on the free end 19. Then the lever 30 is swung in a counterclockwise direction, FIG. 3, to the position shown by full lines to impart tension to both chains 14 and 15 in an amount corresponding to the movement of the chain link receiving slot 31 in the direction in which the tension is to be applied. The direction of pull on the free end 19 of the chain 15 is such as to cause the links to slide downwardly over inclined surfaces 42' and 43' on the opposite sides of the detents 40 and 41 from the shoulders 42 and 43 and to ratchet past the lowermost ends of the detents 40 and 41. On release of tension applying force to the handle 58 a link, such as the link 44, is aligned with the shoulders 42 and 43 and engages them to hold the free end 19 against retrograde movement and the chains 14 and 15 under tension. This is the result of the slight inclination of the links of the free end 19 between the pawl 35 and the slot 31 in the lever 30 where a link of the free end 19 is attached for chain tensioning purposes.

It is necessary to provide additional tension in the chains 14 and 15, the link of the free end 19 is removed from the chain link receiving slot 31 and the lever 30 then is swung back to the position shown by broken lines in FIG. 3 where another link of the free end 19 is inserted in the chain link receiving slot 31. Then the chain tensioning operation is repeated.

After the chains 14 and 15 have been tensioned sufficiently, the free end 19 can be removed from the chain link receiving slot 31 and positioned alongside of the frame means 21 as seen in FIG. 2. The lever 30 then will fall by gravity to the position here shown in overlying relation to the free end 18 of the chain 14.

When it is desired to release the tension in the chains 14 and 15, a blow is struck against the pawl retainer 50 to swing it in a clockwise direction out of engagement with the pawl retaining arm 47. Thereupon the tension in the chain 19 swings the chain locking pawl 35 to the position shown in FIG. 7 in which the free end 19 can readily move thereunder. In the released position of the chain locking pawl 35, FIG. 7, the pawl retaining arm 47 abuts the lateral side of the bridge 24 and thus is prevented from further movement in a counterclockwise direction. The chain tension releasing operation takes place independently of the lever 30 which, if desired, can be constructed to be removable from the transverse pin 26. There is then no likelihood that the operator will be endangered by a sudden movement of the lever 30 when the chain tension is released by release of the pawl retainer 50.

Referring now to FIG. 8 of the drawings, another embodiment of chain tensioning means is shown, generally, at 60 for use in tensioning the chains 14 and 15 and tying down lading 11. The chains 14 and 15 are trained over corner brackets 12' and 13' with the free ends 18 and 19 being arranged to be drawn toward each other by the chain tensioning means 60.

As shown in FIGS. 9, 10, 11, 12 and 13, the chain tensioning means 60 comprises frame means, indicated generally at 61, of trough shape and formed of steel plate or other suitable material. The frame means 61 includes upstanding sides 62 and 63 from a bottom wall 64. At the left end a bolt 65 extends through the sides 62 and 63 and through link 27 of the free end 18. This construction serves to anchor the chain tensioning means 60 against movement in opposition to a tensioning of the chain 15. As shown more clearly in FIGS. 9 and 11, sections 66 and 67 of the upstanding sides 62 and 63 are severed therefrom and provided with reverse turns for positioning the link 27 midway between the sides 62 and 63. It will be observed that the bolt 65 extends through the downturned end portions of the sections 66 and 67.

Provision is made for tensioning the chain 15 against the tension in the chain 14 by a bifurcated first class lever that is indicated, generally, at 68. It may be formed of a steel forging and it is provided with trunnions 70 and 71 that extend through slotted openings 72 and 73 in extensions 74 and 75 that are formed integrally with the upstanding sides 62 and 63. The trunnions 70 and 71 project through washers 76 and 77 and their outer ends are headed over at 78 and 79 to prevent spreading apart of the extensions 74 and 75 and to hold the lever 68 in proper operating position. At its distal end the lever 68 has integral furcations 80 and 81 having shoulders 82 and 83, FIGS. 9 and 10, that are arranged to engage a link, such as the link 84, of the free end 19 of the chain 15 with the next link 85 being positioned between the furcations 80 and 81. At its other end the lever 68 has a handle 86 over which a pipe extension 87 can be slipped to provide for increased leverage. On rotation of the lever 68 in a clockwise direction by force applied to the handle 86 through the pipe extension 87, the link 84 and thereby the free end 19 of the chain 15 is moved to the left and thus is tensioned by movement of the shoulders 82 and 83 of the furcations 80 and 81 in the direction in which the chain 15 is tensioned, the tension being transmitted to the other chain 14 which is anchored at one end to the frame means 61 and at the other end to the bed of the railway flat car or truck as indicated at 10 in FIG. 1.

In order to hold the free end 19 of the chain 15 in the tensioned position, a chain locking pawl indicated, generally, at 89 and formed of a steel forging is employed. The chain locking pawl 89 is formed with integral oppositely extending trunnions 90 and 91 that project through openings 92 and 93, FIG. 9, in the sides 62 and 63 of the frame means 61 near its right end. Formed integrally with the chain locking pawl 89 are upstanding ears 94 and 95 which are provided with a connecting section 96 at their bases from which detents 98 and 99 depend having nose portions 100 and 101, FIG. 12, at their lower ends which engage the upper surface of the bottom wall 64 to limit counterclockwise rotation of the chain locking pawl 89. Shoulders 102 and 103, FIG. 9, on the depending detents 98 and 99 engage the adjacent link 104 and hold it and thereby the free end 19 of the chain 15 against retrograde movement. The next link 105 is positioned between the depending detents 98 and 99. The chain locking pawl 89 is arranged to fall by gravity to the position shown in broken lines in FIG. 13 behind successive links, such as the link 104, as the free end 19 of the chain 15 is tensioned by rotation of the lever 68 in the manner described. After the free end 19 of the chain 15 has been tensioned to the extent possible by rotation of the lever 68 from the position shown in FIG. 10, and the chain locking pawl 89 has engaged a link, such as the link 104, to hold the free end 19 against retrograde movement, the tensioning operation is repeated by returning the lever 68 to the position shown in FIG. 10 and engaging another link, similar to the link 84, and repeating the operation. The slotted openings 72 and 73, through which the trunnions 70 and 71 extend, facilitate the disengagement of the furcations 80 and 81 from the link 84 and engagement with another link on return of the lever 68 to the position shown in FIG. 10. The chain tensioning steps are repeated one or more times, depending upon the degree of tension desired for the chains 14 and 15.

When the desired tension has been applied to the chains 14 and 15, the slotted openings 72 and 73 through which the trunnions 70 and 71 project permit the furcations 80 and 81 to be withdrawn from engagement with the free end 19 and then the lever 68 can be rotated to the stored position shown in FIG. 8 which is generally parallel to the bottom wall 64 of the frame means 61.

Figure 13:
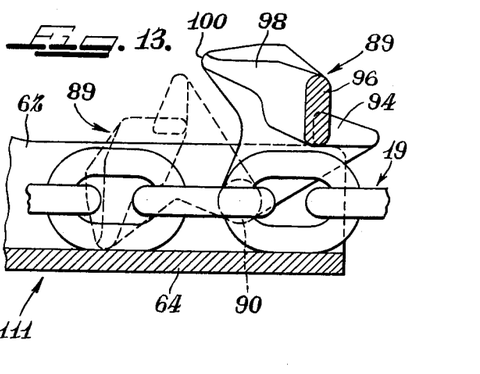
FIG. 13 is a view, at an enlarged scale, of the right end of the chain tensioning means shown in FIG. 10 to show an alternate position of the chain locking pawl.

The tension in the chains 14 and 15 can be released by striking a blow against one or the other of the upstanding ears 94 or 95 to rock the chain locking pawl 89 to the position shown by full lines in FIG. 13. Alternatively, the furcations 80 and 81 can be reengaged with a link of the free end 19 and then rotated sufficiently to relieve the tension as applied to the depending detents 98 and 99 of the chain locking pawl 89. Thereafter it can be easily rotated from the broken line position shown in FIG. 13 to the full line position. Then the restraining force applied to the handle 86 of the lever 68 is released and the tension of the chain 15 withdraws its free end 19 through the frame means 61 with the horizontal links ratcheting past the furcations 80 and 81 accompanied by slight oscillations of the lever 68 if it is manually held under some force. Once the free end 19 is released, the lever 68 can also be released and it will gravitate to a horizontal position opposite to that shown by broken lines in FIG. 10.

Figure 14:
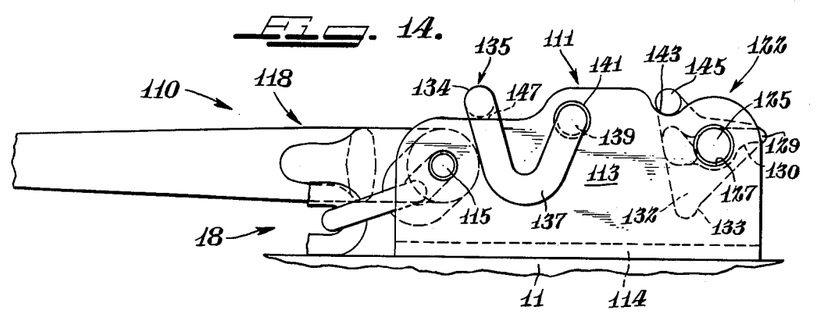
FIG. 14 is a view, in side elevation of another embodiment of this invention.
Figures 15, 17:
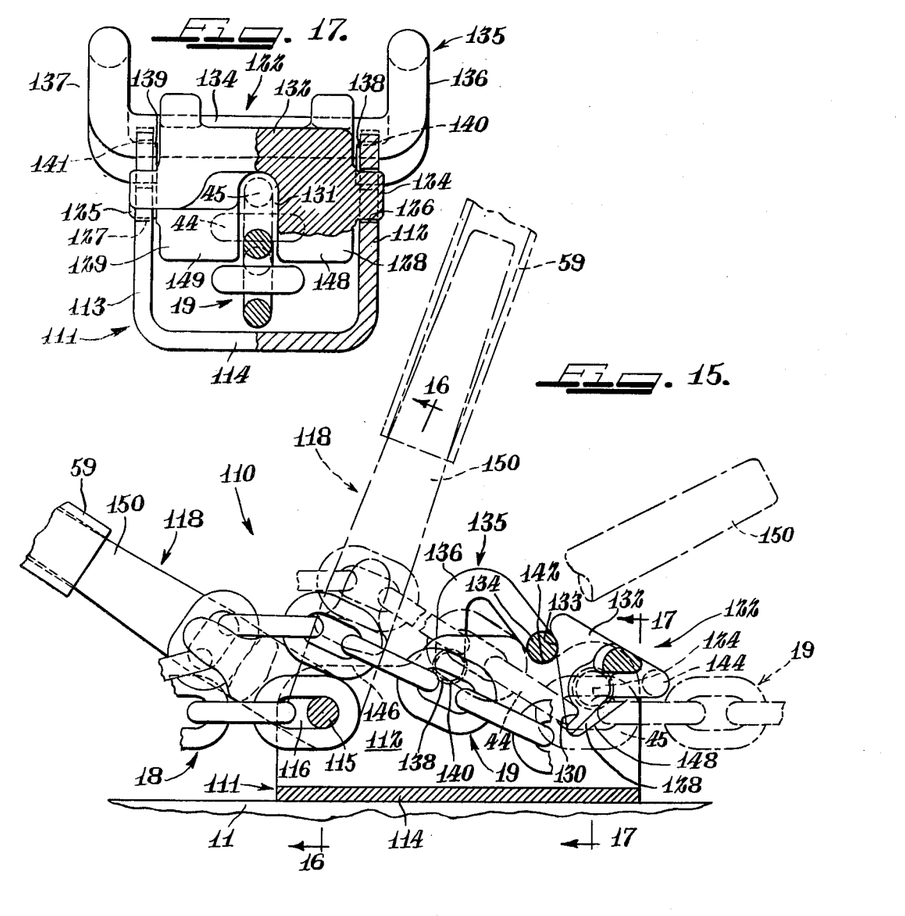
FIG. 15 is a vertical sectional view of the construction shown in FIG. 14 illustrating different positions of the chain tensioning lever.
FIGS. 16 and 17 are vertical sectional views taken generally along lines 16—16 and 17—17 respectively of FIG. 15.

FIGS. 14 to 19 inclusive show a modified form of the chain tensioning means as illustrated in FIGS. 1 to 7 inclusive. The chain tensioning means, shown generally at 110 in FIGS. 14 and 15, is arranged to receive the free ends 18 and 19 of the lading tying chains 14 and 15 for the purpose of tightening them around the lading 11. The chain tensioning means 110 includes a trough shaped frame means 111 that is somewhat shorter than the trough shaped frame means 21 as a result of a modified arrangement of the means for retaining the chain locking pawl, to be described, in the chain tensioning position. The frame means 111 includes upstanding sides 112 and 113 connected by a bottom wall 114 and may be formed of rolled steel plate properly shaped to the configuration shown. A shaft 115 extends transversely through the upstanding sides 112 and 113 and the ends are suitably secured thereto as by welding.

Figures 11, 18:
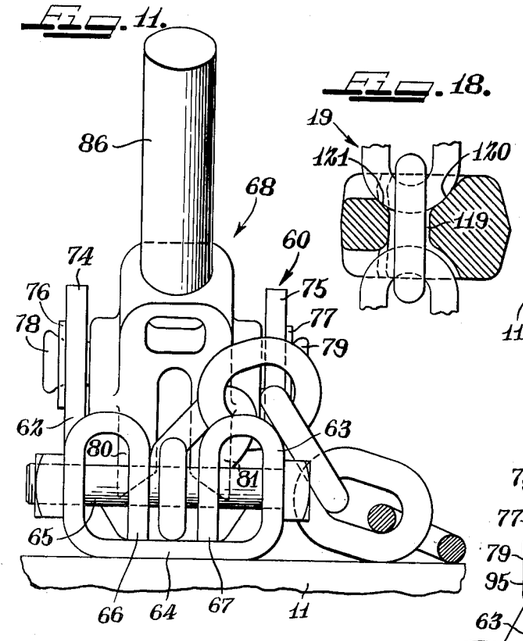
FIG. 11 is an end view of the chain tension means shown in FIGS. 9 and 10, the view being taken at an enlarged scale and looking from left to right.
FIGS. 18 and 19 are horizontal sectional views taken generally along lines 18—18 and 19—19 respectively of FIG. 16.
Figure 12:
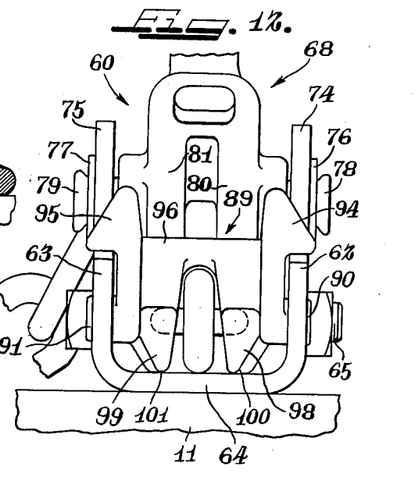
FIG. 12 is a view, similar to FIG. 11, but taken from the opposite end of the chain tensioning means and looking from right to left.
Figure 16:
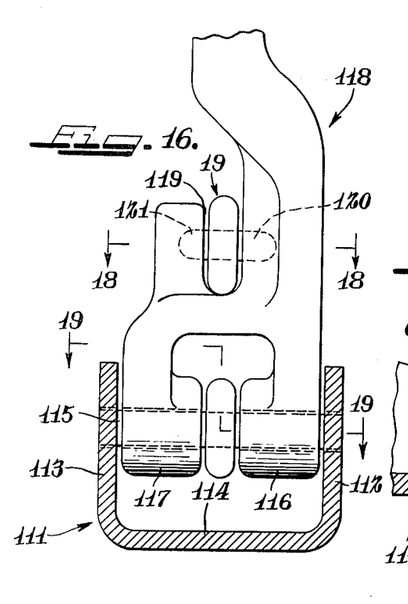
Figure 19:
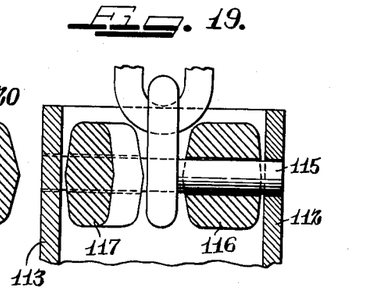

Rotatably mounted on the transverse shaft 115 are furcations 116 and 117 of a bifurcated second class lever that is indicated, generally, at 118. Like the lever 30 previously described, the lever 118 is provided with a chain link receiving slot 119, FIG. 16, for receiving a link of the free end 19 of the chain 15. As shown in FIG. 18 one of the links is arranged to bear against shoulders 120 and 121 when the lever 118 is swung from the position shown by broken lines in FIG. 15 to its position shown by full lines to effect tightening or tensioning of the chains 14 and 15.

In order to hold the free end 19 of the chain 15 against retrograde movement after it has been tensioned by operation of the lever 118, a generally triangularly shaped chain locking pawl, indicated generally at 122, is provided. The chain locking pawl 122 has oppositely extending trunnions 124 and 125, FIG. 17, that project into openings 126 and 127 in the sides 112 and 113 of the trough shaped frame means 111. In this manner the chain locking pawl 122 is freely rotatable between the sides 112 and 113. It is provided with integral depending detents 128 and 129 having transversely extending shoulders 130 against which a link, such as link 44, FIG. 15, is arranged to bear. The next link 45 is located in a slot 131 between the detents 128 and 129 as shown in FIG. 17.

The chain locking pawl 122 has an integral pawl retaining section 132 that extends generally radially from the trunnions 124 and 125 and is provided with a concave shouldered portion 133 against which an intermediate cylindrical portion 134 of a bifurcated pawl retainer, shown generally at 135, is arranged to react to hold the chain locking pawl 122 against rotation in a counterclockwise chain releasing direction. The pawl retainer 135 has U-shaped furcations 136 and 137 that are located outwardly of the upstanding sides 112 and 113 and are provided, FIG. 17, at the ends with trunnions 138 and 139 that extend toward each other through openings 140 and 141 in the upstanding sides 112 and 113. It will be noted that the pawl retainer 135 is located between the lever 118 and the chain locking pawl 122. Since it is located here, it is possible to reduce the length of the trough shaped frame means 111 over that employed for the construction shown in FIGS. 1 to 7 inclusive.

Rotation of the pawl retainer 135 in a clockwise direction is limited by engagement of the ends of the intermediate cylindrical portion 134 with shoulders 142 and 143, FIGS. 14 and 15, that face upwardly on the upper sides of the upstanding sides 112 and 113. These shoulders 142 and 143 also are engaged by outstanding bosses 144 and 145 that are formed integrally with the chain locking pawl 122 when it is in the chain releasing position as shown in FIG. 14. Also as shown in this figure, when the pawl retainer 135 is in the released position, the ends of the intermediate cylindrical portion 134 bear against upper surfaces 146 and 147 of the sides 112 and 113.

When the free end 19 of the chain 15 is threaded between the upstanding sides 112 and 113, the forward ends of the horizontal linke engage downwardly inclined surfaces 148 and 149 on the detents 128 and 129 and thus direct the links toward the upper surface of the bottom wall 114 and underneath the chain locking pawl 122.

In operation the free end 19 of the chain 15 is threaded underneath the chain locking pawl 122 and is manually tightened to the maximum extent that is convenient. Then one of the links is positioned in the chain link receiving slot 119 of the lever 118 which is provided with a handle 150 that can be grasped manually and to which the pipe extension 59 can be applied for the purpose of obtaining additional leverage. The handle 118 then is rotated from the broken line position shown in FIG. 15 in a counterclockwise direction to the position as shown by full lines. This is accomplished while the pawl retainer 135 is in the pawl retaining position as shown in FIG. 15. The free end 19 of the chain 15 is drawn underneath the chain locking pawl 122 as the horizontal links successively slide downwardly over the surfaces 148 and 149 on the detents 128 and 129 and they ratchet past these detents. In the full line position of the free end 19 as shown in FIG. 15, the tension applied thereto by the lever 119 is such that on slight release of it, the link that extends generally horizontally immediately in front of the shoulders 130 of the detents 128 and 129 moves into engagement therewith and thereby the free end 19 is held against retrograde movement. Then the lever 118 can be returned to the intermediate broken line position after removal of the free end 19 from the slot 119 and the operation repeated.

In order to release the tensioned chains 14 and 15, the pawl retainer 135 is swung from its position shown in FIG. 15 in a counterclockwise direction to move the intermediate cylindrical portion 134 out of engagement with the concave shoulder portion 133 on the pawl retaining section 132. The tension applied to the chains 14 and 15 is released promptly and the chain locking pawl 122 is rotated to the position shown in FIG. 14 where the links of the free end 19 move underneath the pawl retaining section 132 which now extends downwardly between the sides 112 and 113.

After the chains 14 and 15 have been tightened to the desired extent, the free end 19 is removed from the slot 119 and the pipe extension 59 is removed from the handle 150. The lever 118 then can be left in the position shown by full lines in FIG. 15 or it can be rotated to the position to the right of this figure where only the handle 150 is shown by broken lines.

FIG. 14 shows the position in which the lever 118 is stored when no tension is applied to the free end 18 of the chain 14. Here it will be observed that it is located generally parallel to the bottom wall 114. In the stored condition the pawl retainer 135 is in the retracted position shown in FIG. 14 as is also the chain locking pawl 122. This arrangement provides a minimum height for the assembly in the stored position.

Each of the chain tensioning means 20, 60 and 110, by the respective pawl 35, 89 and 122, is arranged to retain the tension applied to the chains 14 and 15 by operation of the respective lever 30, 68 and 118 and any additional tension that may be developed due to shifting of the lading 11 in transit and to release such tension without likelihood of injury to the operator. This results from the location of the free end 19 of the chain 15 between the sides 22 and 23 of the trough shaped frame means 21, between the sides 62 and 63 of the trough-shaped frame means 61, and between the sides 112 and 113 of the trough shaped frame means 111. In each case the free end 19 of the chain 15 is confined between the sides and also is unattached to the lever 30, 68 or 118 as the case may be. Consequently none of these levers is subject to unexpected sudden movement that might take place on release of the tension in the chains 14 and 15 if they were attached thereto.

What is claimed is:

1. Chain tensioning means comprising: trough-shaped frame means adapted to be anchored against movement and to receive a free end of a chain between its sides at one end, second-class lever means pivoted to said frame means between its sides remote from said one end and having a chain link receiving slot to receive a link of said free end of said chain to tension it on rotation of said lever means by movement of said slot along said frame means in the direction in which said chain is tensioned, chain locking pawl means pivoted to said frame means between its sides and adjacent said one end in overlying relation to said chain, said pawl means having depending detent means adapted to engage a link of said chain to hold it under tension as applied thereto by said lever means and a pawl retaining arm extending in chain restraining position laterally toward said one end of said frame means, and pawl retainer means pivoted to said sides of said frame means adjacent said one end thereof and having an intermediate portion overlying said pawl retaining arm to hold said pawl means in chain restraining position and rotatable out of overlying relation to said pawl retaining arm to release said pawl means from restraining position with respect to said chain.

2. Chain tensioning means comprising: trough-shaped frame means adapted to be anchored against movement and to receive a free end of a chain between its sides at one end, second-class lever means pivoted to said frame means between its sides remote from said one end and having a chain link receiving slot to receive a link of said free end of said chain to tension it on rotation of said lever means by movement of said slot along said frame means in the direction in which said chain is tensioned, chain locking pawl means pivoted to said frame means between its sides and adjacent said one end in overlying relation to said chain, said pawl means having depending detent means adapted to engage a link of said chain to hold it under tension as applied thereto by said lever means and a pawl retaining arm extending in chain restraining position laterally toward said one end of said frame means, pawl retainer means pivoted to said sides of said frame means adjacent said one end thereof and having an intermediate portion overlying said pawl retaining arm to hold said pawl means in chain restraining position and rotatable out of overlying relation to said pawl retaining arm to release said pawl means from restraining position with respect to said chain, stop means on said frame means cooperating with said pawl retaining arm to limit rotation thereof in the chain released position, and stop means on said frame means cooperating with said pawl retainer means to limit rotation thereof in the pawl retaining arm released position.

3. Chain tensioning means comprising: trough-shaped frame means adapted to be anchored against movement and to receive a free end of a chain between its sides at one end, second-class lever means pivoted to said frame means between its sides remote from said one end and having a chain link receiving slot to receive a link of said free end of said chain to tension it on rotation of said lever means by movement of said slot along said frame means in the direction in which said chain is tensioned, chain locking pawl means pivoted to said frame means between its sides and adjacent said one end in overlying relation to said chain, said pawl means having depending detent means adapted to engage a link of said chain to hold it under tension as applied thereto by said lever means and a pawl retaining section extending generally radially with a shouldered portion facing said lever means, and pawl retainer means pivoted to said sides of said frame means between said lever means and said chain locking pawl means and having an intermediate portion in engagement with said shouldered portion to hold said pawl means in chain restraining position and rotatable out of engagement with said shouldered portion to release said pawl means from restraining position with respect to said chain.

4. Chain tensioning means comprising: trough-shaped frame means adapted to be anchored against movement and to receive a free end of a chain between its sides at one end, second-class lever means pivoted to said frame means between its sides remote from said one end and having a chain link receiving slot to receive a link of said free end of said chain to tension it on rotation of said lever means by movement of said slot along said frame means in the direction in which said chain is tensioned, chain locking pawl means pivoted to said frame means between its sides and adjacent said one end in overlying relation to said chain, said pawl means having depending detent means adapted to engage a link of said chain to hold it under tension as applied thereto by said lever means and a pawl retaining section extending generally radially with a shouldered portion facing said lever means, pawl retainer means pivoted to said sides of said frame means tween said lever means and said chain locking pawl means and having an intermediate portion in engagement with said shouldered portion to hold said pawl means in chain restraining position and rotatable out of engagement with said shouldered portion to release said pawl means from restraining position with respect to said chain, stop means on said frame means cooperating with said pawl retaining section to limit rotation thereof in the chain released position, and stop means on said frame means cooperating with said pawl retainer means to limit rotation thereof in the pawl retaining section released position.

References Cited by the Examiner
UNITED STATES PATENTS

| | | | |
|---|---|---|---|
| 858,240 | 6/1907 | Werner | 254—74 |
| 1,537,070 | 5/1925 | Dixon | 254—74 |
| 2,919,895 | 1/1960 | Johnson | 254—78 |

FOREIGN PATENTS

| | | |
|---|---|---|
| 499,466 | 1/1954 | Canada. |

WILLIAM FELDMAN, *Primary Examiner.*

MILTON S. MEHR, *Examiner.*